United States Patent [19]
Baker

[11] 3,906,167

[45] Sept. 16, 1975

[54] CONSTANT CURRENT POWERED TELEPHONE CIRCUITS

[76] Inventor: Thaddeous J. Baker, 1216 Cherrywood Dr., Richardson, Tex. 75080

[22] Filed: July 17, 1973

[21] Appl. No.: 379,932

[52] U.S. Cl. ............................... 179/81 R; 179/16 F

[51] Int. Cl. ............................................ H04m 1/00

[58] Field of Search... 179/81 R, 81 B, 16 F, 170 T, 179/1 HF; 323/8, 4; 328/183; 307/297

[56] References Cited

UNITED STATES PATENTS

| | | | |
|---|---|---|---|
| 3,035,122 | 5/1962 | Livingstone | 179/16 F |
| 3,509,367 | 4/1970 | Orsen | 307/228 |

*Primary Examiner*—Kathleen H. Claffy
*Assistant Examiner*—Joseph Popek
*Attorney, Agent, or Firm*—Warren H. Kintzinger

[57] ABSTRACT

An adaptive power source (talk battery type telephone circuit) equipped telephone circuit employing a constant current generator system supplying optimum current to a telephone over lines varying from a few feet to many miles. Transistors are used biased with fixed resistors and unbypassed emitters to supply a fixed value of current independent of the supply voltage. This "talk battery" stable constant current power feed to a telephone circuit is established, by transistor base voltage and the emitter resistor, to a circuit facing a high impedance into transistor collectors.

14 Claims, 3 Drawing Figures

CONSTANT CURRENT POWERED TELEPHONE CIRCUITS

Figure 1:
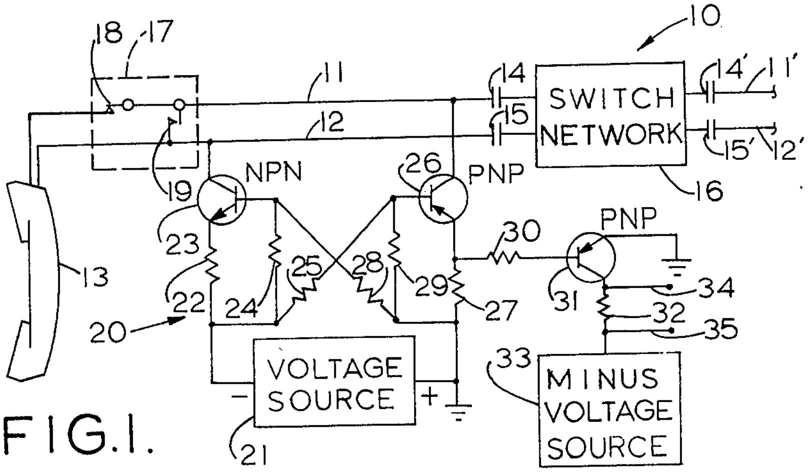

This invention relates in general to telephone "talk battery" type circuits, and in particular to constant current generator equipped telephone circuits.

Conventional talk battery telephone equipment circuits frequently require adjustments for optimum current flow through the telephone instrument of the circuit particularly with telephone line distance variance running from a few feet of line to many miles of line. In many of these circuits the absolute value of the supply voltage is a critical sensitive factor particularly with excessive power drain in direct current flow to other telephones compounding power supply requirement problems. These problems contribute to undesired variance in phone system audio levels such as to require selected limiting resistors matched to different length lines with wide ranging loop resistance values. Interconnecting line systems many times are unbalanced systems with audio coupling capacitors loaded by unbalanced dc levels from one side to the other with voice transmission limited thereby.

It is, therefore, a principal object of this invention to provide a constant current powered telephone system for optimum constant audible level performance over a wide range of loop resistance values with line lengths ranging from a few feet to many miles.

Another object is to provide such a telephone system having high impedance drive to a balanced line for proper telephone operation.

A further object is to provide telephone circuits with the supply voltage not critical and with the circuits virtually independent of variations in the supply voltage through a wide range.

Another object is to provide such telephone circuits useful for detecting the "off hook" condition of a telephone, detecting dial pulses, that is used for supplying power for tone dialing, and for monitoring line balance for direct current.

Features of this invention useful in accomplishing the above objects include, in constant current powered telephone circuits, use of transistors as constant current generators useful in telephone circuits with solid state controls. Connection between telephone circuits is through blocking capacitors, that block direct current flow, but allow voice frequencies to be conducted between tha capacitor connected phone circuits. Constant current generating transistors biased with fixed resistors and unbypassed emitters supply a fixed value of current in practice independent of the supply voltage through a wide operational range. This is with the current value established by the base voltage and the emitter resistor and high impedance presented at the collector. Connection of two such generators, an NPN transistor and a PNP transistor, as a complimentary pair facilitates driving of a constant current through a balanced line, long or short, and at the same time provides high impedance to both sides of the line.

Specific embodiments representing what are presently regarded as the best modes of carrying out the invention are illustrated in the accompanying drawing.

Figure 2:
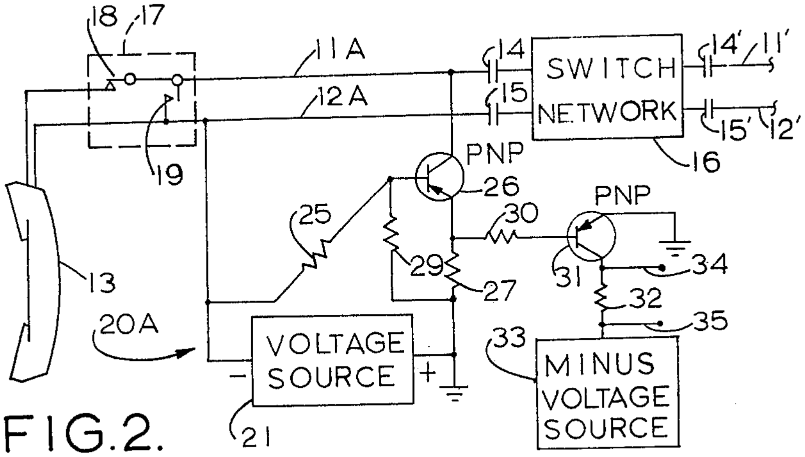
Figure 3:
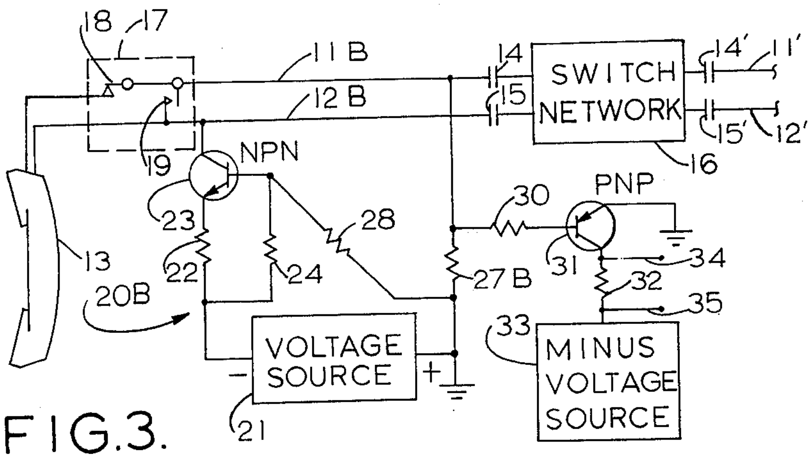

In the drawing:

FIG. 1 represents a combination block schematic view of a telephone system showing a two transistor constant current powered telephone line connected to the system;

FIG. 2, a telephone system similar to FIG. 1 with a PNP transistor constant current powered telephone line; and FIG. 3, a telephone system similar to FIGS. 1 and 2 with a NPN transistor constant current powered telephone line.

Referring to the drawing:

The telephone system 10 of FIG. 1 is shown to have a two wire 11 and 12 telephone line connected to telephone handset 13 at one end and through blocking capacitors 14 and 15, respectively, to telephone line switching network 16. Switching network 16 may have many telephone line wire connections such as typified by the connection through capacitors 14' and 15' to the two wires 11' and 12' of a telephone line extending to a telephone (not shown). Telephone handset 13 is placeable on a base 17 (exact detail not shown), or on the equivalent thereof, with a contact 18 therein open when the line is not in use with handset 13 in the base 17 cradle and closed for current flow when the handset 13 is lifted from the cradle. Contacts such as typified by normally open contact 19 are also included within base 17 as the dial contacts, or their equivalent, between wires 11 and 12 of the telephone line.

A talk battery adaptive constant current power circuit 20 is provided in the form of a voltage source 21 having a positive terminal connected to ground and a negative terminal connected through resistor 22 to the emitter of NPN transistor 23 having a collector connection to wire 12 of the telephone line. The negative terminal of voltage source 21 is connected through resistor 24 to the base of transistor 23 and also through resistor 25 to the base of PNP transistor 26 having a collector connection to telephone line wire 11 and emitter connection through resistor 27 to ground. Resistor 24 is part of a voltage divider including resistor 28 connected between the negative and positive terminals of voltage source 21 with the junction of resistors 24 and 28 connected to the base of transistor 23. In like manner resistor 25 and resistor 29 form a voltage divider connected between the negative and positive terminals of voltage source 21 with the junction of resistors 25 and 29 connected to the base of transistor 26. Thus, the transistors 23 and 26 are biased with fixed resistors and unbypassed emitters to thereby exhibit the characteristic of supplying a fixed value of current independent of supply voltage through a wide range of operational supply voltage levels. Current value is established by the base voltage and the emitter resistor for transistors 23 and 26 with a high impedance presented by each of the transistor collectors to the respective wire 11 and wire 12 telephone line connections thereof. Further with transistors 23 and 26 connected as a complimentary pair of constant current generators to wires 12 and 11, respectively, of a telephone line it is possible to drive a constant current through a balanced line and at the same time provide a high impedance to the telephone line. This provides a talk battery type supply to a balanced telephone line that may vary in length and/or resistance over a very wide range with a constant current drive through the line providing optimum operation of the telephone handset 13.

The talk battery type supply 20 of FIG. 1 in addition to supplying power to the telephone handset 13 is also used to detect the off hook telephone in use condition with current flow and voltage developed across one or the other of resistors 22 and 27 useable for application in telephone control switching. The power supply 20 is also useful in detecting dial pulses with resulting variations in voltage developed across resistors 22 and 27. In implementing these additional capabilities the junction of resistor 27 and the emitter of PNP transistor 26 is connected through resistor 30 to the base of PNP transistor 31 having an emitter connection through resistor 32 to minus voltage source 33. Logic level output signals such as dial pulses developed across resistor 32 are connected through lines 34 and 35 to switching control equipment, such as switch network 16, and the voltages developed may be made compatible with solid state devices used in the control of switching equipment. The circuit is useful for monitoring line balance for direct current and the supply circuit 20 may be used to supply power for tone dialing. While preexisting conventional talk battery circuits used in the telephone equipment generally require adjustment for optimum current flow through the telephone instrument the power supply circuit 20 provides a constant audible level without use of selected limiting resistors and provides a constant audible level over a wide range of loop resistance values.

With an NPN transistor and a PNP transistor used as current generators in supply circuit 20 when R22 = R27, R24 = R29 and R28 = R25, the current flowing through wires 11 and 12 of the telephone line is a constant except when the line loop is broken and may be expressed by the formula: $I \approx V21\ R24/R24 + R28$. Further, the voltages developed across R22 and R27 are equal and proportional to the current flow in the telephone line wires.

Referring now to the embodiment of FIG. 2, if the telephone line with wires 11A and 12A is relatively short and unbalance with dc loading of capacitors 14 and 15 not excessive then a single constant current source PNP transistor 26 equipped power circuit 20A may be used. With this embodiment portions the same as with the embodiment of FIG. 1 are numbered the same and others with some change have lettered numbers as a matter of convenience and some portions that are the same are not described again. PNP transistor 26 as a constant current generator is connected to telephone line wire 11A just the same as transistor 26 is connected to wire 11 in FIG. 1 with, however, wire 12A connected directly to the negative terminal of voltage source 21 instead of to the collector of a constant current generator as in FIG. 1. A resistor could be included in the connection from line 12A to the negative terminal of voltage source 21 with this resistor developing voltages with current flow just as with resistors 22 and 27 of FIG. 1.

With reference to the embodiment of FIG. 3 a single constant current source NPN transistor 23 equipped power circuit 20B is used with a relatively short telephone line where unbalance and dc loading of capacitors 14 and 15 are not excessive. Here the collector of transistor 23 is connected to line 12B while line 11B is directly connected to the junction of resistors 27B and 30. Resistor 27B that develops signal voltages with dialing induced current changes is connected to ground that is a floating common in some installations.

Both single constant current source power circuits of FIGS. 2 and 3 while used in unbalanced power source telephone systems do provide constant audible level power without the use of selected limiting resistors. These two embodments provide a constant audible level over a reasonably wide range of loop resistance values where unbalance and dc loading of the blocking capacitors 14 and 15 is not a pronounced problem.

Whereas this invention is herein illustrated and described with respect to specific embodiments hereof, it should be realized that various changes may be made without departing from essential contributions to the art made by the teachings hereof.

I claim:

1. In a telephone circuit having a two wire telephone connection to a telephone instrument and through a blocking capacitor for each line to other telephone system line wires, a stabilized current generator circuit supplying constant current when the two-wire telephone line is closed through the telephone instrument comprising, a voltage source having at least two terminals, a positive terminal and a relatively negative terminal; a first multielectrode solid state device having at least an input electrode, a control electrode, and an output electrode with the output electrode connected to a first wire of said two-wire telephone line; the input electrode of said multi-electrode solid state device being connected through first resistive means to a first terminal of said voltage source; first voltage divider means connected between the positive terminal and the relatively negative terminal of said voltage source; said voltage divider means having a tap connection with said control electrode of said multi-electrode solid state device; circuit means interconnecting a second wire of said two-wire telephone line and a second terminal of said voltage source; and wherein said first multi-electrode solid state device is a transistor.

2. The telephone stabilized current generator circuit of claim 1, wherein said first and second multi-electrode solid state devices are transistors; and voltage level responsive circuit means connected to a junction point between the input electrode of said second multi-electrode solid state device and the second resistive means for detecting voltage variations across said second resistive means in detecting telephone "off hook" and to convert signal pulses originating at said telephone instrument to logic levels used in solid state dial signal pulse registers.

3. The telephone stabilized current generator circuit of claim 1, wherein said input electrode is an emitter of said transistor, the control electrode is the base of said transistor, and the output electrode is the collector of said transistor; and including a voltage level responsive circuit means connected to a junction point between the input electrode and the first resistive means for detecting voltage variations across said first resistive means.

4. The telephone stabilized current generator circuit of claim 3, wherein said transistor is a PNP transistor; and said first terminal is the positive terminal of said voltage source.

5. The telephone stabilized current generator circuit of claim 3, wherein said transistor is a NPN transistor; and said first terminal is the relatively negative terminal of said voltage source.

6. The telephone stabilized current generator circuit of claim 1, wherein said input electrode is an emitter of said transistor, the control electrode is the base of said transistor, and the output electrode is the collector of said transistor; and with wherein said circuit means is a second resistive means and inculding a voltage level responsive circuit means connected to a junction point between the second wire of said two wire telephone line and the second resistive means for detecting voltage variations across said second resistive means.

7. The telephone stabilized current generator circuit of claim 6, wherein said transistor is a PNP transistor; and said first terminal is the positive terminal of said voltage source.

8. The telephone stabilized current generator circuit of claim 6, wherein said transistor is a NPN transistor; and said first terminal is the relatively negative terminal of said voltage source.

9. In a telephone circuit having a two-wire telephone connection to a telephone instrument and through a blocking capacitor for each line to other telephone system line wires, a stabilized current generator circuit supplying constant current when the two-wire telephone line is closed through the telephone instrument with, a voltage source having at least two terminals, a positive terminal and a relatively negative terminal; a first multi-electrode solid state device having at least an input electrode, a control electrode, and an output electrode with the output electrode connected to a first wire of said two-wire telephone line; the input electrode of said multi-electrode solid state device being connected through first resistive means to a first terminal of said voltage source; first voltage divider means connected between the positive terminal and the relatively negative terminal of said voltage source; said voltage divider means having a tap connection with said control electrode of said multi-electrode solid state device; a second multi-electrode solid state device having at least an input electrode, a control electrode, and an output electrode with the output electrode connected to said second wire of said two wire telephone line; with said second multi-electrode solid state device interconnecting said second wire of said two wire telephone line and a second terminal of said voltage source, the input electrode of said second multi-electrode solid state device connected through second resistive means to said second terminal of said voltage source; second voltage divider means connected between the positive terminal and the relatively negative terminal of said voltage source; and said second voltage divider means having a tap connection with said control electrode of said second multi-electrode solid state device.

10. The telephone stabilized current generator circuit of claim 9, wherein said first resistive means and said second resistive means are of substantially equal value.

11. The telephone stabilized current generator circuit of claim 9, wherein both of said first and second multi-electrode solid state devices are transistors, one a PNP type transistor and the other an NPN type transistor, with for each transistor said input electrode being the emitter, the control electrode the base, and the output electrode the collector.

12. The telephone stabilized current generator circuit of claim 11, wherein said first and second resistive means are of substantially equal value.

13. The telephone stabilized current generator circuit of claim 12, wherein said first and second voltage divider means are of substantially equal ratio with; and the tap connections of said first and second voltage divider means with transistor bases being at substantially the same voltage quantitative value from respective positive and negative terminals of said voltage source.

14. The telephone stabilizer current generator circuit of claim 13, wherein a connection of said stabilizer current generator circuit is made to a common ground for a telephone system having a plurality of two wire telephone lines and a switching network control center in a system facing high impedance into transistor collectors with balanced two wire telephone lines.

* * * * *